United States Patent Office 3,725,085
Patented Apr. 3, 1973

3,725,085
FLAVOR ENHANCEMENT OF ALLIUM PRODUCTS
Sigmund Schwimmer, Berkeley, Calif., assignor to the United States of America as represented by the Secretary of Agriculture
No Drawing. Filed July 9, 1971, Ser. No. 161,311
Int. Cl. A23l 1/26
U.S. Cl. 99—140 R
14 Claims

ABSTRACT OF THE DISCLOSURE

The flavor of onion, garlic, and the like is enhanced by the addition of gamma-glutamyl transpeptidase.

---

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

The invention relates to and has among its objects the provision of novel methods for enhancing the flavor of onion, garlic, and other edible products of the genus allium. The objects of the invention also include the provision of allium-containing compositions of enhanced flavor. Further objects of the invention will be evident from the following description wherein parts and percentages are by weight unless otherwise specified.

Basically, the objects of the invention are attained by adding gamma-glutamyl transpeptidase to an allium product. The invention can be applied to any of the edible allium products such as onion, garlic, leek, chives, shallot, etc., and these may be in various forms such as fresh, dehydrated, rehydrated, unblanched frozen, irradiated, etc.

A primary advantage of the invention is that the amount of flavor in allium products is substantially enhanced. Therefore, their efficacy as flavoring agents is increased in that a smaller amount of allium product will provide the same flavor level as that attained with a larger amount of the untreated material. The products of the invention are useful for all the usual applications of allium products—for example, they may be used in flavoring such foods as sausages, sauces, gravies, pickles, relishes, soups, stews, pizzas and other bakery products, fish, meats, vegetables, etc.

The enzyme, gamma-glutamyl transpeptidase, used in accordance with the invention may be obtained from various sources such as kidney beans, asparagus, mammalian kidney, sprouted onions, etc. It should be noted that the enzyme is present only in *sprouted* onions, that is, onions which have just begun to grow. Mature onions do not contain the enzyme in question.

The isolation of transpeptidase from the source material can be accomplished by various ways well known in the art. For example, the enzyme can be obtained from sprouted onions by the processes of grinding, juicing, centrifuging, blending, filtering and precipitating when applied in the proper sequence with the addition of reagents such as sodium chloride, ammonium sulfate, and various buffers. The isolation process is set forth in detail in Example 4, below.

Various ways of practicing the invention are described below, having specific reference to onion by way of illustration and not limitation. For the sake of brevity, gamma-glutamyl transpeptidase is referred to as GGT.

To enhance the flavor of dehydrated onion flakes or powder, the dehydrated material is rehydrated by contact with water and GGT is added to the rehydrated material, causing the desired enhancement of flavor. The rehydrated onion thus enriched in flavor can then be used directly for flavoring any desired food product, or, alternatively, it may be preserved for future use by such conventional procedures as dehydration or freezing.

Another plan is to incorporate dehydrated onion with GGT in dry form (for example, prepared by freeze-drying an isolate of the enzyme from sprouted onions). The resulting composition can be held indefinitely in such condition. It should be realized that as long as the composition is maintained in the dry state, the flavor enhancement is potential rather than actual. However, when the composition is rehydrated for ultimate use, action of GGT occurs and the flavor enhancement is realized.

To enhance the flavor of fresh ion, the bulbs are sliced, chopped, crushed, or otherwise reduced to particles and the resulting mass contacted with GGT. Here the flavor enhancement takes place directly because of the moist conditions. The resulting material may be used as such for flavoring a desired food, or, alternatively, it may be preserved for future use by such conventional procedures as dehydration or freezing.

Since GGT is effective in small amounts, the compositions of the invention will include a major proportion of edible allium material and a minor proportion of GGT. In any particular case, the amount of GGT will vary, depending on such factors as the type of allium product, the muturity thereof, and on the degree of flavor enhancement desired. Pilot trials may be conducted with varying amounts of GGT to determine the proportion which yields a product of desired flavor level.

It is generally preferred to use an alkaline material in conjunction with GGT for the reason that this enzyme is most active at a slightly alkaline pH, particularly at pH 8 to 8.5. Such pH level can be obtained with various known alkaline buffers as long as they are non-toxic. Sodium bicarbonate is preferred as it is inexpensive, non-toxic, and readily affords the desired pH level. Other examples of alkaline agents are disodium hydrogen phosphate and trisodium phosphate.

Hereinabove it has been mentioned that mammalian kidney is a source of GGT. The enzyme can be isolated from the organs and used in such isolated form. However, since kidneys contain a large proportion of GGT, these organs may be used as such for flavor enhancement in accordance with the invention. To this end, fresh kidneys of cattle, swine, or lambs obtainable from meat packers may be comminuted and added in minor proportion to allium products. For preparing dry products, the comminuted kidneys may be dehydrated (for example, by freeze drying) and incorporated with dehydrated onion, garlic, or the like. Alternatively, the comminuted fresh kidneys may be incorporated with fresh onions, garlic, or the like and the resulting mixture dehydrated for future use.

The mode of action of GGT in enhancing flavor is explained as follows, having reference to onion by way of illustration and not limitation.

The characteristic flavor of onion is due to the formation of volatile organic sulphur-containing compounds. These compounds are formed by the action of a particular enzyme on substrates which may be designated as a primary flavor precursor. Both the enzyme and the precursor are naturally present in the onion tissue. More particularly, the enzyme is a lyase and the primary flavor precursors are S-alkenyl-L-cysteine sulphoxides. The development of flavor may be illustrated by the following equation:

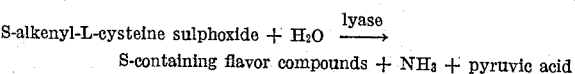

S-alkenyl-L-cysteine sulphoxide + $H_2O$ $\xrightarrow{\text{lyase}}$

S-containing flavor compounds + $NH_3$ + pyruvic acid

It may be noted that lyase is present not only in fresh allium products but also in dehydrated products because the conditions used in drying do not substantially affect this enzyme and the step of blanching conventionally used prior to dehydration with many fruits and vegetables is not employed with allium products.

There also exist in the onion tissue certain substrates which may be termed secondary flavor precursors. More particularly, these are gamma-L-glutamyl-S-alkenyl-cysteine sulphoxides. The lyase which is normally present in the tissue is unable to convert the secondary flavor precursors into flavor components so that these precursors are not utilized. I have found, however, that GGT has the ability to convert the secondary flavor precursors into primary flavor precursors. The net effect then is that GGT makes available the primary precursors which can then be converted by lyase into the desired flavor components. The effect of GGT may be illustrated by the following equation:

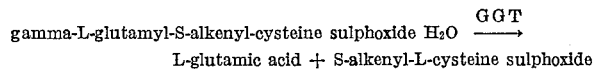

gamma-L-glutamyl-S-alkenyl-cysteine sulphoxide $H_2O \xrightarrow{GGT}$

L-glutamic acid + S-alkenyl-L-cysteine sulphoxide

Although the foregoing is believed to be an accurate description of the mode of cation of GGT, it is not intended that the invention be limited by this or any other theory. From the practical standpoint, the critical point is that I have demonstrated that GGT provides a flavor enhancement above and beyond that obtainable by the enzyme systems naturally present in allium products.

EXAMPLES

The invention is further demonstrated by the following illustrative examples. Some of the reported experiments are not in accordance with the invention; they are included for purpose of comparison.

The activity of GGT preparations is expressed in terms of milli-units. One milli-unit (mu.) of GGT activity is the amount of enzyme which will liberate one nanomole ($10^{-9}$) mole of p-nitroaniline from L-gamma-glutamyl-p-nitroanilide in one minute under standard assay conditions. For example, 230 mu. would liberate $230 \times 10^{-9}$ mole of p-nitroaniline.

The products of various experiments were assayed for flavor by measurement of pyruvic acid therein. This acid is not itself a flavor component but provides a measure of flavor because when the primary flavor precursors are converted by lyase into flavor components, pyruvic acid is released in chemically equivalent amount. In sum, the determination of pyruvic acid content constitutes a more accurate measure of flavor than could be done by organoleptic appraisals.

EXAMPLE 1

Release of flavor components by addition of GGT to rehydrated allium powders

A sample of dehydrated garlic powder was rehydrated in conventional manner. Then, 100 mg. of the rehydrated material was mixed with 230 mu. of GGT isolated from sprouted onions, and the mixture was held for 3 hours at room temperature. After this period, 1 ml. of 2 N hydrochloric acid was added to inactivate the enzymes. The resulting suspension was diluted to 100 ml. with water and the increase in flavor assayed by determination of the increase in pyruvic acid content.

In a second experiment the same procedure as above was followed with the exception that the pH of the mixture of rehydrated garlic and GGT was adjusted to pH 8.1 prior to starting the 3-hour holding period. The pH adjustment was made by adding 0.08 M aqueous tris-(hydroymethyl)-amino-methane hydrochloride.

The two experiments described above were repeated, but employing different starting materials, namely:

Recently-prepared dehydrated onion powder (designated onion A).

Dehydrated onion powder which had been stored for several months (designated onion B).

Dehydrated onion powders prepared from particular portions of the bulb, i.e., inner bulb and outer bulb.

The results are summarized in the following table.

| | Increase in pyruvic acid (micromoles/g.) | | | |
|---|---|---|---|---|
| | Buffer | | No buffer | |
| Sample | Without GGT | With GGT | Without GGT | With GGT |
| Garlic | 80 | 192 | 112 | 164 |
| Onion A | 27 | 67 | 23 | 52 |
| Onion B | 13 | 28 | 11 | 20 |
| Onion-inner bulb | 20 | 91 | ¹ N.D. | 52 |
| Onion-outer bulb | 42 | 53 | 28 | 33 |

¹ N.D. indicates not determined.

EXAMPLE 2

Comparison of flavor increases in rehydrated onion powder by addition of onion GGT and kidney GGT at different pH levels The procedure described in Example 1 was used. Kidney GGT (940 mu.) was isolated from pig kidney; onion GGT (462 mu.) was isolated from sprouted onions. The pH was adjusted to 8.5 and 7.3 by addition of the proper amounts of 0.1 M aqueous tris-(hydroxymethyl)-aminomethane hydrochloride.

The results are summarized below.

| | Increase in pyruvic acid, micromoles/g. | | |
|---|---|---|---|
| pH | No enzyme | Kidney GGT | Onion sprout GGT |
| 8.5 | 25 | 49 | 71 |
| 7.3 | 24 | 38 | 47 |

EXAMPLE 3

Reconstitution of dehydrated allium products

This example illustrates typical methods for reconstituting (rehydrating) dehydrated allium products in order to attain enhanced flavor.

(A) One part by weight of dehydrated allium material plus 0.01 part of either onion or kidney GGT plus 9 parts of water are stirred together at room temperature for 1–3 hours.

(B) Same as in A but 0.1 to 0.5 part of sodium bicarbonate are added to achieve a pH of approximately 8.

EXAMPLE 4

Isolation of Gamma-glutamyl Transpeptidase from Sprouted Onion

Step 1: Eleven hundred g. of chilled sprouted onion bulbs, divested of skin, roots, most of the stems, lateral buds and bladeless leaves were sliced into wedges small enough to pass through the hopper (3 x 5 cm.) of an Acme fruit and vegetable juicer fitted with a strip of Whatman No. 1 filter paper to cover the perforat-ons in the side of the cylindrical rotatable basket. The combined grinding, centrifugation, and filtration accomplished by this device resulted, after washing the pulp with 100 ml. of water, in 890 ml. of liquid.

Step: The slightly turbid extract was centrifuged at 27,000× G for 30 minutes at 0° C. The supernatant liquid was discarded; the precipitate was washed with 179 ml. of water and recentrifuged.

Step 3: To this precipitate was added 90 ml. of 0.5 M sodium chloride. One hour after thorough mixing (Omni-Mixer) to insure complete dispersal, the resulting suspension was centrifuged, and the supernatant was discarded. The precipitate was dispersed in 90 ml. of 2 M sodium chloride. After one hour the suspension was again centrifuged and the precipitate was discarded yield a supernatant liquid.

Step 4: After 10 days at 4° C., the precipitate which developed in this liquid was removed after centrifugation and the supernatant fraction was retained Step 5: This fraction, 90 ml., was concentrated at 0° C.

by means of pressure dialysis (Richardson and Kornberg, 1964) for 16 hours against 4 liters of 0.005 M tris-hydrogen chloride buffer (pH 8.0) and centrifuged to remove precipitate to yield 11.5 ml. of supernatant liquid.

Step 6: To this liquid was added, at 4° C., 3.4 g. ammonium sulfate to achieve 0.5 saturation. After centrifugation at 34,000× G for 10 minutes, 4.6 g. of ammonium sulfate (0.99 saturation) was added to the supernatant. Centrifugation at 34,000× G for 20 minutes and filtration gave the desired gamma-glutamyl transpeptidase.

Having thus described my invention, I claim:

1. A composition which comprises:
   (a) a major proportion of dehydrated edible allium material,
   (b) a minor proportion of added gamma-glutamyl transpeptidase in an amount sufficient to produce a desired level of flavor, and
   (c) a non-toxic alkaline agent in an amount to provide a pH of about from 8.0 to 8.5.
2. The composition of claim 1 wherein the allium is onion.
3. The composition of claim 1 wherein the allium is garlic.
4. The composition of claim 1 wherein the allium is chive.
5. The composition of claim 1 wherein the allium is leek.
6. The composition of claim 1 wherein the alkaline agent is sodium bicarbonate.
7. The process of improving the flavor of allium products which comprises incorporating therewith the enzyme, gamma-glutamyl transpeptidase, in an amount sufficient to produce a desired level of flavor.
8. The process of claim 7 wherein the allium product is onion.
9. The process of claim 7 wherein the allium product is garlic.
10. The process of claim 7 wherein the allium product is chive.
11. The process of claim 7 wherein the allium product is leek.
12. The process of claim 7 wherein there is additionally incorporated a non-toxic alkaline agent in an amount to provide a pH of about from 8.0 to 8.5.
13. The process of claim 7 wherein there is additionally incorporated sodium bicarbonate in an amount to provide a pH of about from 8.0 to 8.5.
14. In the process of rehydrating a dehydrated allium product wherein said product is contacted with water to rehydrate it, the improvement which comprises conducting the rehydration in the presence of a minor proportion of added gamma-glutamyl transpeptidase in an amount sufficient to produce a desired level of flavor, whereby to obtain a rehydrated product having an enhanced flavor.

References Cited
UNITED STATES PATENTS

| | | | |
|---|---|---|---|
| 2,760,869 | 8/1956 | Yanick | 99—140 |
| 3,424,593 | 1/1969 | Bockman et al. | 99—140 X |

OTHER REFERENCES

Heatherbell et al.: Enzymatic Regeneration of Volatile Flavor Components in Carrots, J. Agr & Fd Chem., vol. H, #2 (1971), pp. 281–4.

Carson: "Onion Flavor," Chemistry & Physiology of Flavors, AVI Pub. Co., Westport, Conn. (1967), pp. 390–405.

Matikkala et al. "r-Glutamylpeptidase in Sprouting Onion Bulbs," Acta Chem. Scand., 19 (1965), #5, pp. 1261–1262.

Szenczuk: Chem. Abst. 70:9007(k) (1969).

Schwimmer et al.: "Kinetics of the Enzymatic Development of Pyruvic Acid and Odor in Frozen Onions Treated with Cysteine C-S Lyase," Journ. Fd. Sci., vol. 33 (1968), pp. 193–196.

JOSEPH SCOVRONEK, Primary Examiner

SIDNEY MARANTZ, Assistant Examiner

U.S. Cl. X.R.

99—103, 107, 109; 195—66